July 13, 1948.    G. B. COOKE    2,444,978
CLOSURE
Filed Nov. 8, 1944
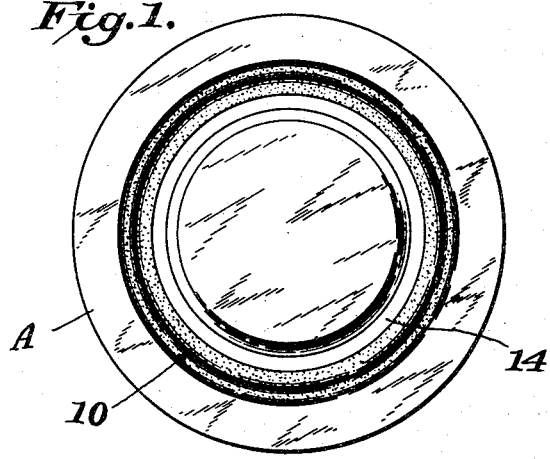
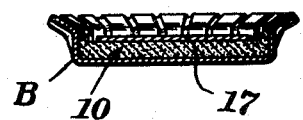
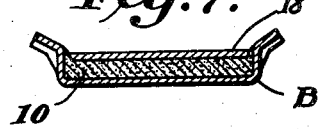
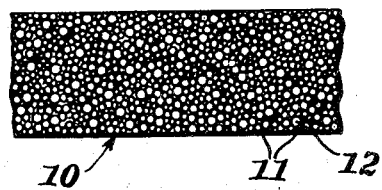
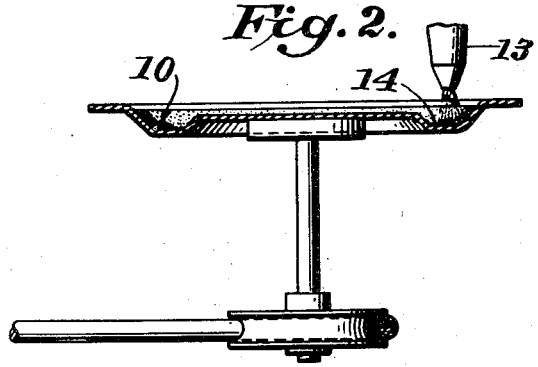
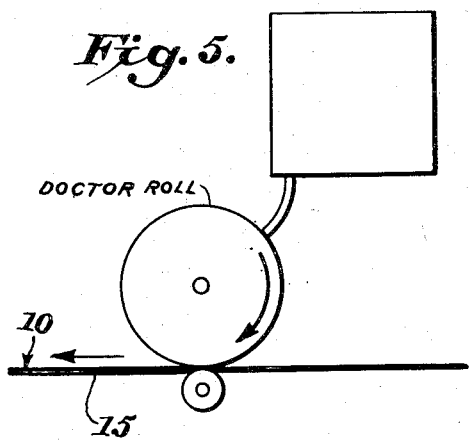
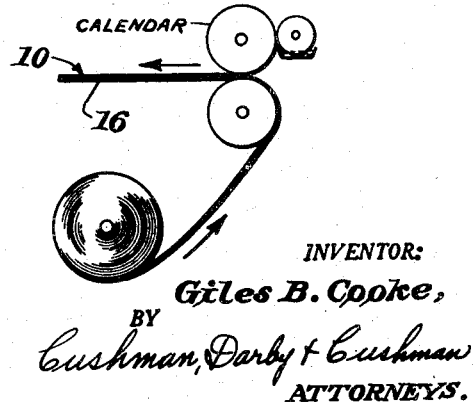
INVENTOR:
Giles B. Cooke,
BY
Cushman, Darby & Cushman
ATTORNEYS.

Patented July 13, 1948

2,444,978

UNITED STATES PATENT OFFICE 2,444,978

CLOSURE

Giles B. Cooke, Baltimore, Md., assignor to Crown Cork & Seal Company, Inc., Baltimore, Md., a corporation of New York Application November 8, 1944, Serial No. 562,561

3 Claims. (Cl. 215—40)

This invention relates to resilient glutinous materials and to processes for their production. More particularly, this invention is concerned with cork substitutes and structures comprising them, and with processes for imparting to water-resistant glutinous materials a degree of resiliency, i. e., an extended resilient life which permits structures to be produced therefrom which may serve as substitutes for cork, particularly as sealing means in container closures.

Satisfactory substitutes for cork are in constant demand. In order to fulfill requirements to serve as a cork substitute, any composition must possess several exact characteristics, the most important of which are a specific degree of resiliency and water resistance. Many attempts have been made to produce suitable cork substitutes from various materials and by numerous different methods. In order to satisfactorily compete commercially with cork, any substitute therefor must be produced by a rather inexpensive method and from relatively inexpensive materials. Thus, a large number of the attempts to produce cork substitutes have involved a modification of vast agricultural materials, such as cornstalks, peanut hulls, and the like. Although considerable success has been obtained in this direction, the optimum of desired features have not yet been obtained. Principally, the deficiencies of these methods involve the use of methods for the transformation of the basic ingredients to impart thereto the required properties of resiliency and the like which are quite expensive.

A principal object of the present invention is to provide inexpensive substitutes for cork which closely resemble cork in all its desirable characteristics. Another object is the provision of an inexpensive and simple process for the transformation of inexpensive glue composition materials into structures which possess a degree of resiliency and bulk density which make them well suited as substitutes for cork.

A still further object is the provision of new materials for use as cushion liners for bottle caps, sealing layers for container closures, and the like.

Further objects and the entire scope of this invention will become apparent from the detailed description given hereinafter taken in connection with the accompanying drawings.

Referring to the drawings:

Figure 1 is a bottom elevational view of one form of pressed on cap and particularly showing the sealing liner off-set with relation to the sealing groove.

Figure 2 is a side elevation of apparatus employed for producing the sealing liner in the groove of the closure of Figure 1, the apparatus providing for rapidly rotating the closure while the material for forming the sealing layer is introduced to the groove through a nozzle.

Figure 3 is a sectional view of a crown cap having a sealing layer or liner therein and provided with a facing.

Figure 4 is an enlarged sectional view of the sealing material used in the closures of Figures 1 and 3.

Figure 5 is a diagrammatic view showing the liner material being applied by means of a doctor roll to a layer of paper, and Figure 6 is a similar view showing the material being calendered onto a layer of strip material such as Cellophane.

Figure 7 is a view similar to Figure 3 showing an overall facing, and

Figure 8 is a view of a crown cap having a liner therein provided with a layer of backing material.

The several objects are accomplished according to the process of the present invention which comprises homogeneously dispersing a gas or air throughout a thermoplastic glue composition capable of being cured to a water-resistant state, casting this dispersion into a suitable structure and, thereafter, subjecting the cast dispersion to curing conditions whereby a resilient, water-resistant structure 10 is obtained as shown in Figure 4.

Broadly, the process of the invention consists in the following basic procedure. A suitable glue composition material, or a solution thereof, which is capable of being insolubilized by subjection to the action of heat is charged into a mixing vessel equipped with means for subjecting its contents to vigorous agitation and beating. This charge is then agitated and beaten for a sufficient length of time to homogeneously disperse throughout the entire charge minute particles of the gas which is present above the charge during the beating operation. This gas-glue dispersion is then cast into a desirable structure after which the glue is insolubilized by the application of heat. This procedure results in the formation of structures which possess characteristics such as bulk density and a degree of resiliency closely akin to that possessed by cork.

One of the valuable characteristics of container closures according to the present invention is the extended time of usefulness of the sealing liner. A closure liner made from glue-acid addition product, as described herein, is dependent for its continued resiliency upon retaining a portion of the water employed in the preparation of the product. The incorporation of air in minute bubbles produces a structure as shown in Figure 4 which adds materially in retention of the desired moisture content. Thus, for water vapor to pass from the closure liner prepared according to this invention, it is necessary for the water to travel through the solid portion which constitutes the walls 11 about the gas bubbles 12 which are sealed in the material. In other words, the moisture, to escape, is forced to travel a distance many times the thickness of the liner, as defined by the tortuous extended path produced by the walls of the gas bubbles. In this manner, necessary moisture is retained in the liner, keeping the product resilient and flexible over an extended period of time.

The preferred glutinous material for use in this invention consists in viscous solutions of glue which contain an insolubilizing agent, and to which an acid is added in sufficient quantity so as to maintain the glue composition liquid for 4–8 hours in a temperature at about between 80° F. and 120° F. The acid added to the glue forms a salt, although some of the acid may remain uncombined. The acid component of these glue compositions may be termed anti-thickening agents, for they serve to maintain the glue fluent for extended periods of time at elevated temperature, even in the presence of insolubilizing agents. Thus, these compositions are extremely well adapted for use in the present invention, since they permit the required gas-in-glue dispersions to be readily formed and then, once formed, to be directly insolubilized and finally set by the simple application of heat without further modification. These glue compositions are the same as more fully described in a patent application of James W. Fankhanel, Serial No. 478,936, filed March 12, 1943, now Patent No. 2,392,328, dated January 1, 1946.

In the formation of the indicated glue composition, it is preferable to employ hide glue, but blood, casein, or vegetable glue may be employed.

The preferred insolubilized agent in the formation of these glue composition is hexamethylenetetramine. However, other glue insolubilizing or tanning agents may be employed in lieu thereof, for example, aldehyde liberating bodies, e. g., paraformaldehyde and trioxymethylene; aluminum or chromium salts of the type which have a tanning action on glue, e. g., aluminum sulfate, chrome alum; or similar insolubilizing agents.

As disclosed in the indicated Fankhanel application, the preferred anti-thickening agent for the preparation of these glue compositions is nitric acid. However, other acids may be employed for these purposes, such as for example, sulfuric, hydrochloric, acetic, or oxalic acids.

Plasticizers are preferably incorporated in order to aid in the attainment of the desired flexibility in the final product. Where the discussed glue compositions are employed as the base material in these cork substitutes, glycerine is the preferred plasticizer, although other polyhydroxy alkanes, such as ethylene glycol, propylene glycol, and the like may be employed.

The incorporation of finely divided, inert fillers has been found to give body and strength to the glue composition. Finely divided mineral fillers, such as clay or diatomaceous earth have been found especially suitable for this purpose.

The gas to be employed in the formation of the gas-resin dispersions of this invention may be any gas which is inert toward the glutinous material in which it is incorporated. Because of obvious reasons, air is used in the formation of these dispersions, although under certain conditions it may be desirable to employ other inert gas, such as nitrogen or the like. The exact quantity of gas to be employed in the formation of these dispersions will depend, to some extent, upon the exact degree of resiliency desired in the final product, the degree of flexibility of the glutinous material employed and the concentration of fillers incorporated in the resinous compositions.

Any suitable type of agitating equipment which will introduce a gas into a viscous material may be employed for the beating equipment required by this invention. However, it has been found that agitation equipment provided with blades of the "egg beater" variety which may be revolved at high speeds is most desirable.

The processes and products of the present invention may be more fully understood by reference to the following illustrative examples, in which all parts are by weight unless otherwise specified.

*Example I*

97 parts of hide glue are stirred into 123 parts of water maintained at a temperature of 130° F. This mixture is maintained at this temperature and stirred for 10 minutes. Then, 12 parts of nitric acid (specific gravity 1.4) are slowly added streamwise while the glue mixture is continually agitated. After the addition of the nitric acid the mixture is maintained with agitation at 130° F. for 10 minutes, and then the mixture is heated to 160° F. and held there for 10 minutes. The mixture is then cooled to 120° F. during which time 48 parts of glycerine and 97 parts of mineral filler ("Dicalite," a diatomaceous earth manufactured by The Dicalite Company, New York) are added. When the temperature has reached 120° F., 90.2 parts of a 40% aqueous solution of hexamethylenetetramine is stirred into the glue composition.

This glue composition which has been adjusted to the desired viscosity and which contains an insolubilizing agent and an anti-thickening agent is charged into a mixing vessel possessing agitator blades of the "egg beater" variety capable of being revolved at high speeds. The glue composition is then vigorously beaten for 10–15 minutes in order to homogeneously incorporate therein minute particles of air in sufficient amount to impart the desired resiliency.

The resulting dispersion is flowed into any desired container closures for example, of the pressed-on type shown in Figure 1 at A through the conventional type of equipment used in the production of Dacro-type container closures as shown in Figure 2 wherein the dispersion is introduced from the nozzle 13 into the groove 14 while the closure is being rotated. These container closures and the cast glue dispersion contained therein are then subjected to a curing step. This curing operation consists in passing the closures through a series of oven units, the first being maintained at a temperature of 190° F., the second at a temperature of 230° F. and the final oven at a temperature of 245° F. The time of passage through the three oven units is 45 minutes, this period being divided evenly among the three units.

As a result of this process, container closures are produced which possess sealing liners characterized by a degree of resiliency approaching that of cork.

*Example II*

The following ingredients:

| | Parts |
|---|---|
| Hide glue | 150 |
| Water | 210 |
| Nitric acid (S. G. 1.5) | 15 |
| Glycerine | 150 |
| (Filler) Dicalite | 75 |
| Hexamethylenetetramine solution 40% | 30 | are compounded into an air-glue composition dispersion by the procedure outlined in Example 1.

The resulting dispersion is applied to a backing of heavy kraft paper 15 by the use of a conventional doctor roll as shown in Figure 5. This operation results in the production of a cork substitute consisting of an adherent, resilient, water-resistant coating on the paper backing which is very well suited for use as an inner-liner for bottle caps.

In another case the pertinent dispersion was calendered in the conventional manner onto a continuous sheet of regenerated cellulose 16 as shown in Figure 6. The resulting structure possesses properties substantially identical to that of the previous case.

Referring to Figure 8, I have shown a construction as prepared in accordance with Figures 5 and 6 embodied as a liner in a crown cap B wherein the backing is interposed between the cushion material and the top of the cap, as shown at 19.

The present invention provides new and useful structures which serve very satisfactorily for use as substitutes for cork. These products may be prepared from relatively inexpensive ingredients which permit them to economically compete with cork in various applications in which thin layers of cork are employed, such as, for example, container closure liners and the like. Moreover, this invention provides a unique, simple, and commercially feasible process for the production of resilient glutinous structures from inexpensive basic ingredients. These products are useful for all applications for which layers of cork or granulated cork are known to be useful.

Although the composition is water-resistant, it may be desirable, in some instances, to provide a facing for the same when in a container closure of the crown type as shown in Figure 3 at B and such a facing may be a center spot 17 or may completely cover the composition as shown at 18 in Figure 7. The facing material may be water-resistant paper, metal foil, protective adhesive coatings applied in fluid form, or other materials generally used in the closure art. The facing may be adhered to the composition by the natural adhesive property of the composition or an adhesive of the same or different character may be used.

As many varied modifications of the present invention will be apparent to those skilled in the art from the description of the invention given herein, the invention is not to be limited to the specific specification, but is to be limited only as defined in the following claims.

I claim:

1. A container closure having a flexible, resilient sealing liner comprising a compressible, sealing layer comprising a water-insoluble, glue-acid reaction product having homogeneously dispersed throughout minute bubbles of a gas sealed in the said layer, said layer being deposited from an aqueous liquid containing a water-soluble, glue-acid addition product, an insolubilizing agent, a plasticizer and minute bubbles of a gas homogeneously dispersed therein.

2. A container closure having a flexible, resilient sealing liner comprising a compressible, sealing layer comprising a water-insoluble hide glue-nitric acid reaction product having homogeneously dispersed throughout minute bubbles of a gas sealed in the said layer, said layer being deposited from an aqueous liquid containing a water-soluble, hide glue-nitric acid addition product, hexamethylene-tetramine, glycerine and minute bubbles of air homogeneously dispersed therein.

3. A container closure having a compressible, flexible, resilient sealing liner consisting of a fibrous backing material coated with an adherent layer of a water-insoluble, glue-acid reaction product having homogeneously dispersed throughout minute bubbles of a gas sealed in the said layer, said layer being deposited from an aqueous liquid containing a water-soluble, glue-acid addition product, an insolubilizing agent, a plasticizer and minute bubbles of a gas homogeneously dispersed therein.

GILES B. COOKE.

REFERENCES CITED

The following references are of record in the file of this patent:

UNITED STATES PATENTS

| Number | Name | Date |
|---|---|---|
| 948,845 | Caldwell | Feb. 8, 1910 |
| 1,904,445 | Gray | Apr. 18, 1933 |
| 2,138,419 | Gavin | Nov. 29, 1938 |
| 2,238,681 | Dorough | Apr. 15, 1941 |
| 2,389,761 | Burgeni | Nov. 27, 1945 |
| 2,392,238 | Fankhanel | Jan. 1, 1946 |

FOREIGN PATENTS

| Number | Country | Date |
|---|---|---|
| 149,518 | Austria | May 10, 1937 |